(12) United States Patent
Thompson et al.

(10) Patent No.: US 10,641,390 B1
(45) Date of Patent: May 5, 2020

(54) TRUNNION SWASH INSTALLATIONS IN A TRANSMISSION AND METHODS OF ASSEMBLY

(71) Applicant: Parker-Hannifin Corporation, Cleveland, OH (US)

(72) Inventors: Randall Denman Thompson, Lancaster, SC (US); Todd Allen Link, Gray, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 45 days.

(21) Appl. No.: 15/954,911

(22) Filed: Apr. 17, 2018

Related U.S. Application Data

(60) Provisional application No. 62/533,253, filed on Jul. 17, 2017.

(51) Int. Cl.
| | |
|---|---|
| *F04B 1/324* | (2020.01) |
| *F16H 61/437* | (2010.01) |
| *F16H 39/04* | (2006.01) |
| *F04B 53/16* | (2006.01) |
| *F04B 1/146* | (2020.01) |
| *F04B 53/14* | (2006.01) |

(52) U.S. Cl.
CPC ........... *F16H 61/437* (2013.01); *F04B 1/146* (2013.01); *F04B 53/16* (2013.01); *F16H 39/04* (2013.01); *F04B 1/324* (2013.01); *F04B 53/14* (2013.01)

(58) Field of Classification Search
CPC .... F01B 3/0073; F03C 1/0671; F04B 1/2085; F04B 1/324
See application file for complete search history.

(56) References Cited

U.S. PATENT DOCUMENTS

| | | | | |
|---|---|---|---|---|
| 4,269,574 | A | * | 5/1981 | Bobier ................. F04B 1/2071 417/222.1 |
| 4,655,689 | A | * | 4/1987 | Westveer ................ F04B 1/324 417/222.1 |
| 4,903,545 | A | | 2/1990 | Louis et al. |
| 6,223,531 | B1 | | 5/2001 | Hauser et al. |
| 6,487,856 | B1 | * | 12/2002 | Ohashi ..................... F04B 1/22 60/464 |
| 8,997,480 | B1 | | 4/2015 | Bennett |
| 2008/0310972 | A1 | | 12/2008 | Dong et al. |

* cited by examiner

*Primary Examiner* — F Daniel Lopez
(74) *Attorney, Agent, or Firm* — McDonnell Boehnen Hulbert & Berghoff LLP

(57) ABSTRACT

An example pump includes: (i) a swash block having (a) a first trunnion arm on a first side of the swash block, and (b) a second trunnion arm on a second side of the swash block; and (ii) a housing including (a) a through-hole disposed on a respective first side of the housing, (b) a blind hole disposed on a respective second side of the housing opposite the respective first side thereof, and (c) an internal chamber. The swash block is supported within the internal chamber of the housing by the first trunnion arm being positioned in the through-hole of the housing and the second trunnion arm being positioned in the blind hole of the housing.

22 Claims, 7 Drawing Sheets

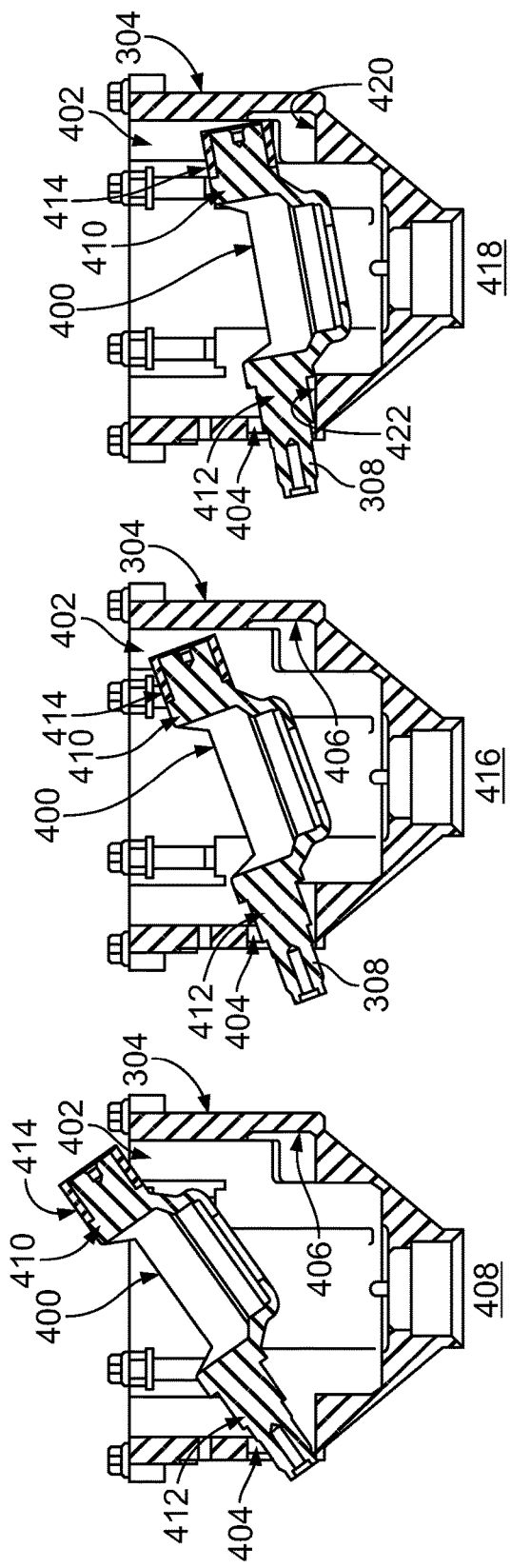
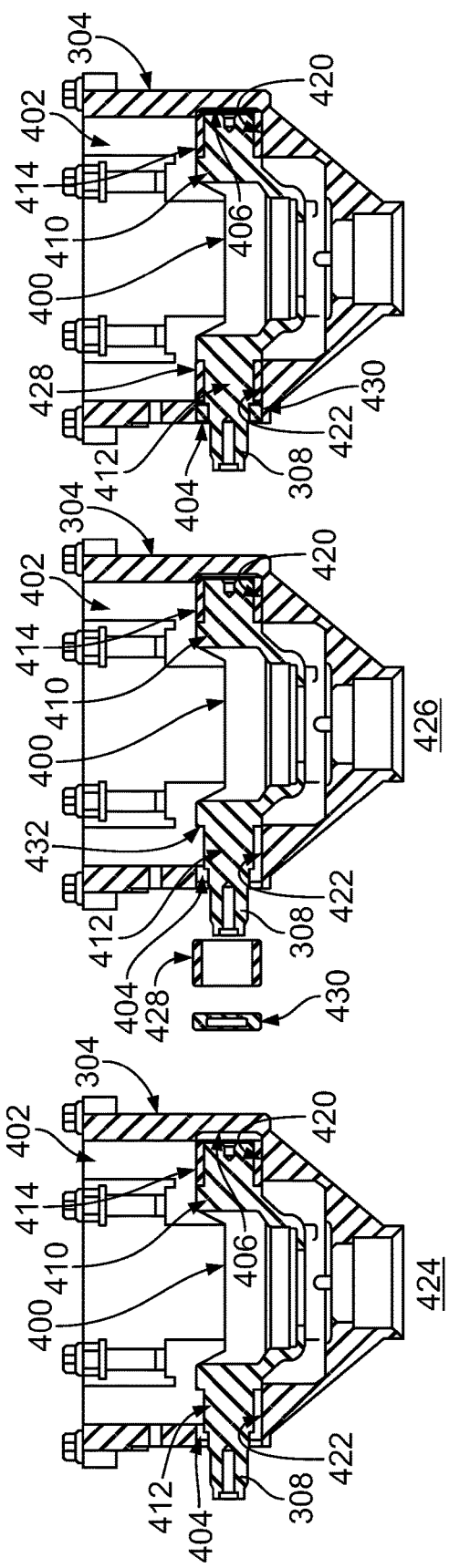

TRUNNION SWASH INSTALLATIONS IN A TRANSMISSION AND METHODS OF ASSEMBLY

CROSS REFERENCE TO RELATED APPLICATION

The present application claims priority to U.S. Provisional patent application Ser. No. 62/533,253, filed on Jul. 17, 2017, and entitled "Trunnion Swash Installations in a Transmission and Methods of Assembly," the entire contents of which are herein incorporated by reference as if fully set forth in this description.

BACKGROUND

The term "transmission" may refer generally to systems that provide speed and torque conversions from a rotating power source to another rotary or linear device. Hydrostatic transmission is a category of transmissions that includes a system in which power is generated and transmitted by pressurizing and releasing fluid through pumps and motors. The system works by converting energy harnessed from the movement of fluid through hydraulic pumps and motors to drive an axle of a vehicle. A hydrostatic transmission can be used to power many types of machines such as tractors, backhoes, and turf equipment, for example. A hydrostatic transmission is characterized in providing high power in a small duration of time.

SUMMARY

The present disclosure describes implementations that relate to installation of trunnion swash in a transmission. In a first example implementation, the present disclosure describes a pump. The pump includes: (i) a swash block having (a) a first trunnion arm on a first side of the swash block, and (b) a second trunnion arm on a second side of the swash block; and (ii) a housing including (a) a through-hole disposed on a respective first side of the housing, (b) a blind hole disposed on a respective second side of the housing opposite the respective first side thereof, and (c) an internal chamber. The swash block is supported within the internal chamber of the housing by the first trunnion arm being positioned in the through-hole of the housing and the second trunnion arm being positioned in the blind hole of the housing.

In a second example implementation, the present disclosure describes a method for assembling a pump. The method includes: (i) providing a housing of the pump, where the housing defines therein a blind hole on a first side of the housing and a through-hole on a second side of the housing opposite the first side, such that the blind hole is concentric with the through-hole; (ii) positioning a swash block in an internal chamber of the housing, where the swash block includes (a) a first trunnion arm on a respective first side of the swash block, and (b) a second trunnion arm on a respective second side of the swash block, wherein the first trunnion arm is concentric with the second trunnion arm; (iii) inserting the second trunnion arm through the through-hole; (iv) aligning the first trunnion arm with the blind hole; and (v) positioning the first trunnion arm partially within the blind hole.

In a third example implementation, the present disclosure describes a pump assembled by a process including: (i) providing a housing of the pump, where the housing defines therein a blind hole on a first side of the housing and a through-hole on a second side of the housing opposite the first side, such that the blind hole is concentric with the through-hole; (ii) positioning a swash block in an internal chamber of the housing, where the swash block includes (a) a first trunnion arm on a respective first side of the swash block, and (b) a second trunnion arm on a respective second side of the swash block, wherein the first trunnion arm is concentric with the second trunnion arm; (iii) inserting the second trunnion arm through the through-hole; (iv) aligning the first trunnion arm with the blind hole; and (v) positioning the first trunnion arm partially within the blind hole.

In a fourth example implementation, the present disclosure describes a hydrostatic transmission. The hydrostatic transmission includes: (i) a motor rotatable by fluid; and (ii) a pump fluidly coupled to the motor section and configured to provide the fluid to the motor. The pump includes: (i) a swash block having (a) a first trunnion arm on a first side of the swash block, and (b) a second trunnion arm on a second side of the swash block; and (ii) a housing including (a) a through-hole disposed on a respective first side of the housing, (b) a blind hole disposed on a respective second side of the housing opposite the respective first side thereof, and (c) an internal chamber. The swash block is supported within the internal chamber of the housing by the first trunnion arm being positioned in the through-hole of the housing and the second trunnion arm being positioned in the blind hole of the housing.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 4A providing a first housing portion and positioning a swash block in an internal chamber within the first housing portion, in accordance with an example implementation.

FIG. 4B illustrates an assembly step at which a swash block is positioned further within an internal chamber, in accordance with an example implementation.

FIG. 4C illustrates an assembly step at which a swash block is positioned further within an internal chamber in preparation for placing the swash block in a set-in position within the first housing portion, in accordance with an example implementation.

FIG. 4D illustrates an assembly step at which a swash block is placed in a set-in position within the first housing portion, in accordance with an example implementation FIG. 4E illustrates an assembly step at which a bushing and a retaining seal are inserted through a through-hole about a trunnion arm, in accordance with an example implementation.

FIG. 4F illustrates a swash block assembled to the first housing portion, in accordance with an example implementation.

DETAILED DESCRIPTION

An example transmission may include a piston-type variable displacement hydraulic pump and a hydraulic motor. The transmission may include a reservoir, which houses the pump, an end-block, which transmits fluid power from the pump to a motor, and a motor housing, which mounts the transmission to a frame of a vehicle.

The reservoir may be referred to as a pump section, and may house a displacement control mechanism or swash mechanism configured to control the flow of fluid generated by the pump. Example swash mechanisms may include a trunnion-mounted swash.

Figure 1:
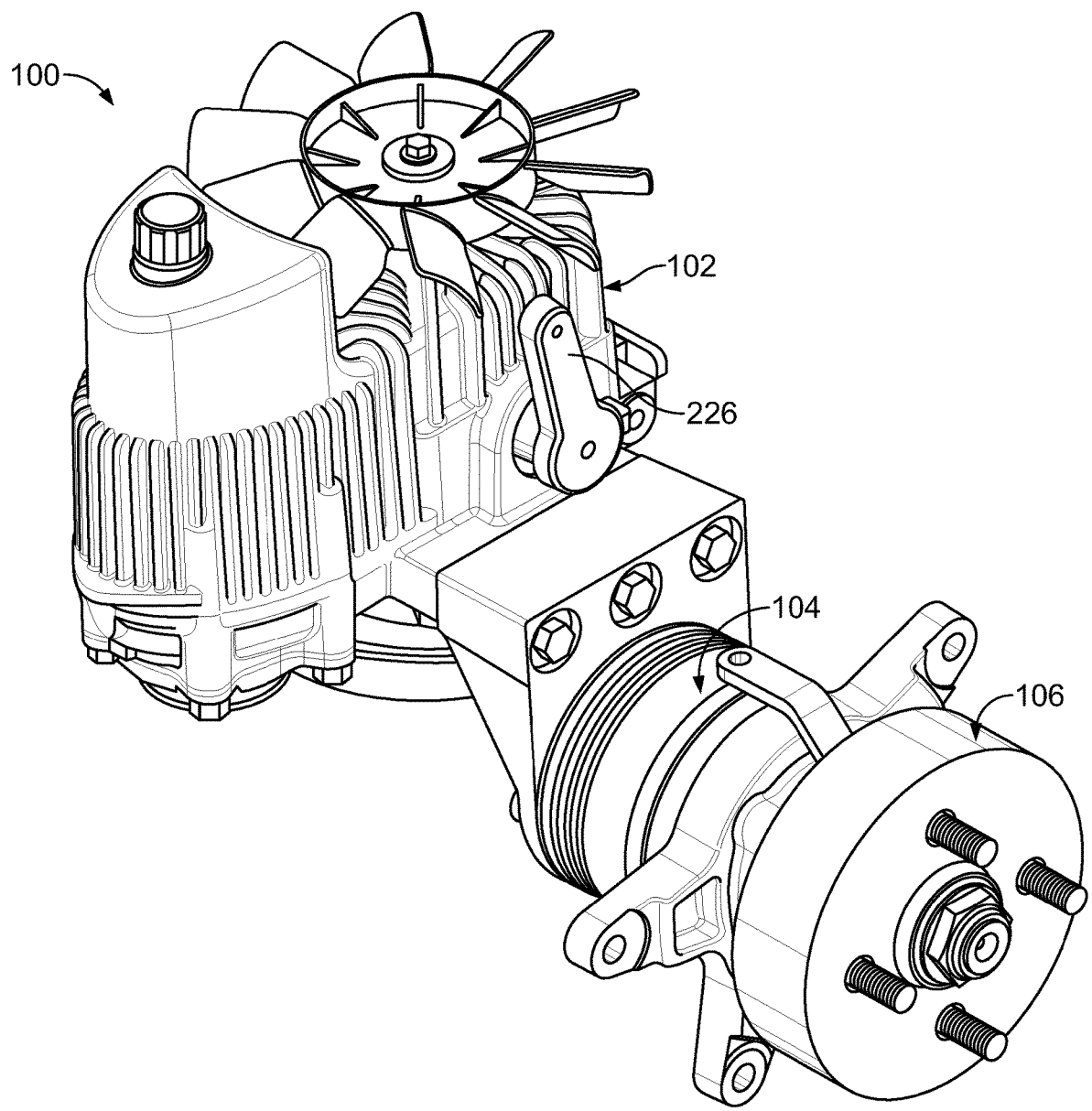
FIG. 1 illustrates a partial perspective view of a hydrostatic transmission with a trunnion-mounted swash, in accordance with an example implementation.

FIG. 1 illustrates a partial perspective view of a hydrostatic transmission 100 with a trunnion-mounted swash block, in accordance with an example implementation. The hydrostatic transmission 100 includes a pump 102 for generating fluid, and a motor 104 rotatable by the fluid provided by the pump 102. The hydrostatic transmission 100 can be mounted to a frame of a vehicle via an interface 106.

Figure 2A:
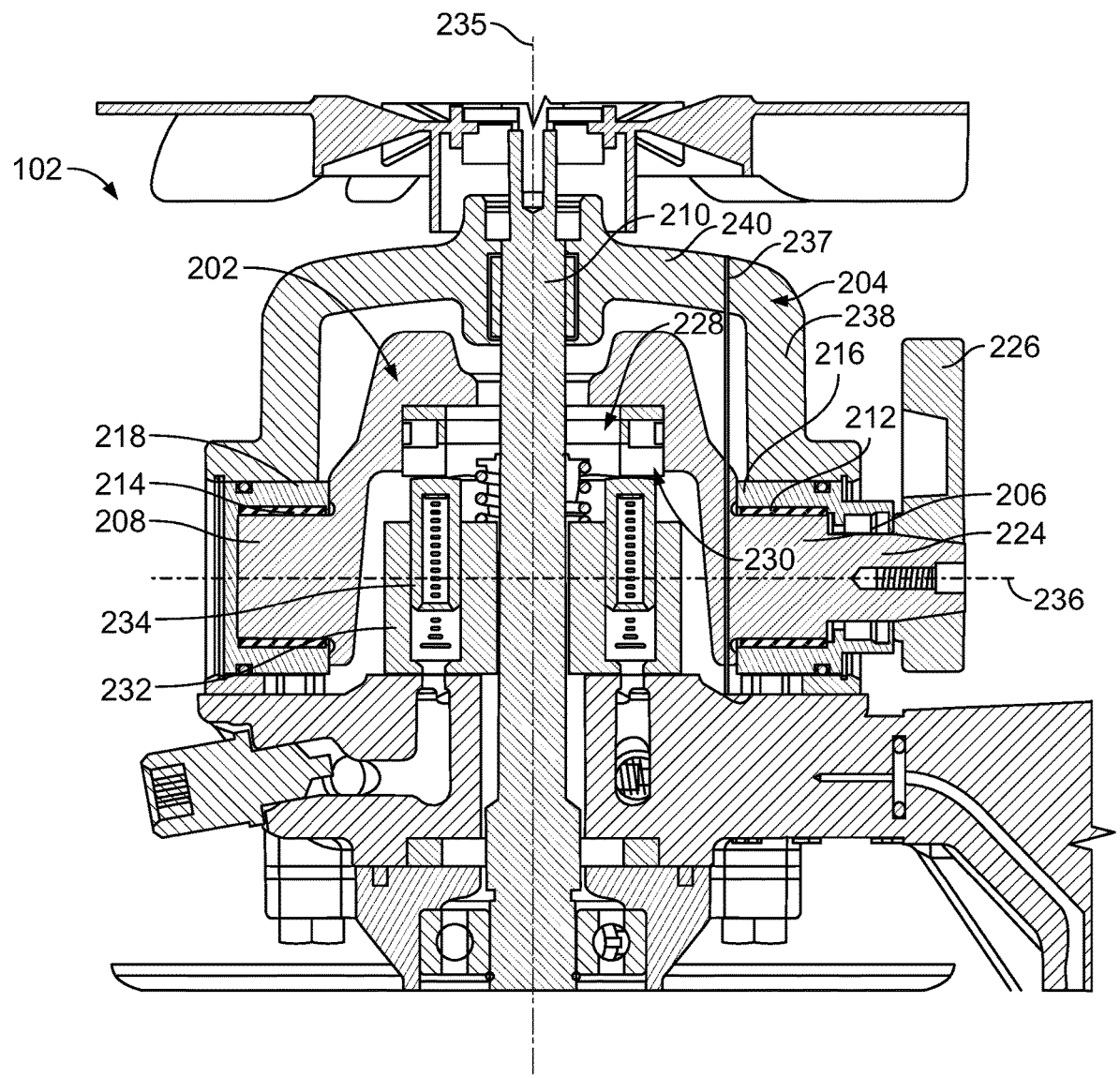
FIG. 2A illustrates a partial cross section of a pump having a trunnion-mounted swash block, in accordance with an example implementation.

FIG. 2A illustrates a partial cross section of the pump 102 having a trunnion-mounted swash block 202, in accordance with an example implementation. As depicted in FIG. 2A, the trunnion-mounted swash block 202 is a single-piece configuration that is supported within a housing 204 at both sides.

Figure 2B:
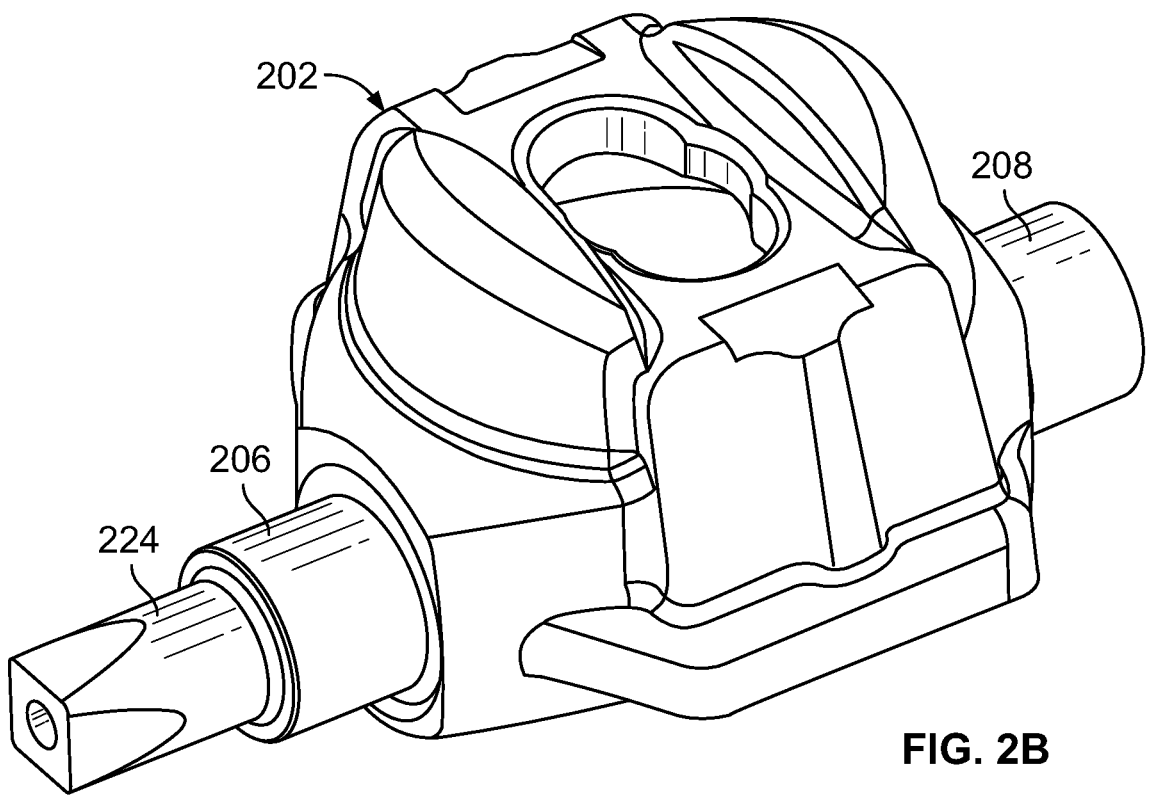
FIG. 2B illustrates a perspective view of the trunnion mounted swash block shown in FIG. 2A, in accordance with an example implementation.

FIG. 2B illustrates a perspective view of the trunnion-mounted swash block 202, in accordance with an example implementation. As depicted, the trunnion-mounted swash block 202 has, or is mounted to, two cylindrical trunnion arms 206 and 208 extending on both sides therefrom.

Referring back to FIG. 2A, the trunnion arms 206 and 208 are configured to be perpendicular to an input shaft 210. The trunnion arms 206 and 208 interface with two cylindrical support bushings 212 and 214, respectively. Specifically, an interior peripheral surface of the bushing 212 interfaces with an exterior peripheral surface of the trunnion arm 206, while an exterior peripheral surface of the bushing 212 interfaces with an interior peripheral surface of a first cylindrical trunnion arm cap 216. In this configuration, the bushing 212 and the trunnion arm 206 are mounted within an open annular space defined by the trunnion arm cap 216. Similarly, an interior peripheral surface of the bushing 214 interfaces with an exterior peripheral surface of the trunnion arm 208, while an exterior peripheral surface of the bushing 214 interfaces with an interior peripheral surface of a second cylindrical trunnion arm cap 218. In this configuration, the bushing 214 and the trunnion arm 208 are mounted within an open annular space defined by the trunnion arm cap 218.

Figure 2C:
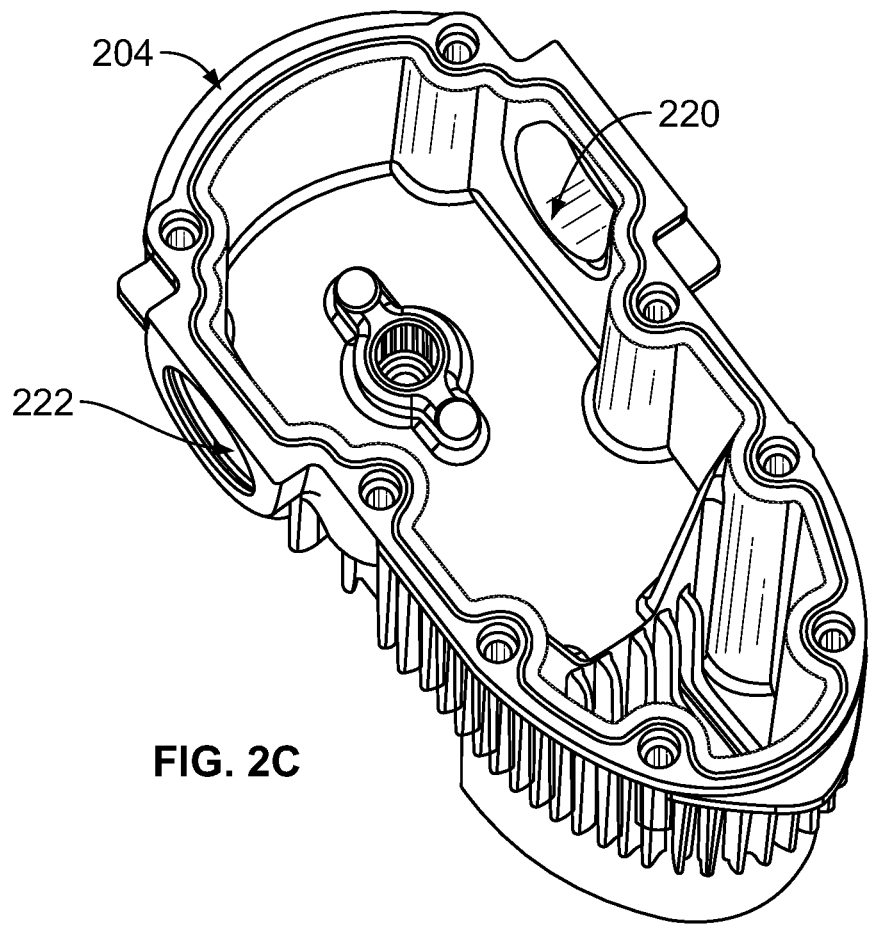
FIG. 2C illustrates a bottom perspective view of a housing of the pump shown in FIG. 2A, in accordance with an example implementation.

FIG. 2C illustrates a bottom perspective view of the housing 204, in accordance with an example implementation. The housing 204 includes trunnion bushing bores 220 and 222 configured to receive the trunnion arm caps 216 and 218, respectively, and facilitate mounting the trunnion-mounted swash block 202 to the housing 204.

Referring back to FIG. 2A, a control arm 224 is integrated with the trunnion arm 206 and the trunnion-mounted swash block 202 and extends outwardly therefrom. An input lever 226 is coupled to an end of the control arm 224. With this configuration, as the input lever 226 is rotated, the control arm 224, the trunnion arm 206, and the trunnion-mounted swash block 202 rotate relative to the input shaft 210. The trunnion-mounted swash block 202 rotates while supported on both sides at the trunnion bushing bores 220 and 222 via the trunnion arms 206 and 208.

As shown in FIG. 2A, the trunnion-mounted swash bock 202 is configured to receive a thrust bearing 228 and a swash plate 230 coupled thereto. The pump 102 also includes a pump barrel 232 configured to house a plurality of piston(s) 234 secured against and engaging with the swash plate 230. The pump barrel 232 and the piston(s) 234 are configured to rotate with the input shaft 210.

In a neutral position, the swash plate 230 is perpendicular to a longitudinal axis 235 of the input shaft 210. In this neutral position, the piston(s) 234 do not reciprocate within the pump barrel 232 as they rotate about and with the input shaft 210, and fluid might not be provided from the pump 102 to the motor 104. If the input lever 226 is rotated, the trunnion-mounted swash block 202 and the swash plate 230 rotate about an axis (e.g., a longitudinal axis 236 of the trunnion arms 206 and 208) perpendicular to the longitudinal axis 235 of the input shaft 210. In this rotated position, the piston(s) 234 are forced to reciprocate within the pump barrel 232 as they rotate about the input shaft 210. Different rotation angles change respective strokes of the piston(s) 234, resulting in different amounts of fluid flow generated from the pump 102. The stroke of a piston of the piston(s) 234 may be defined as an extent of linear travel of the piston within its pump barrel 232.

In examples, to assemble the pump 102, the housing 204 may be divided (e.g., split vertically) into two portions. For instance, the housing 204 may be divided along a virtual line 237 shown in FIG. 2A into a first housing portion 238 and a second housing portion 240. So, the trunnion-mounted swash block 202 along with the bushing 214 (and the trunnion cap 218) can be inserted from one side (from the right side in FIG. 2A) of the second housing portion 240. The first housing portion 238 may then be configured as a cover plate in which the bushing 212 and the trunnion cap 216 are mounted. The first housing portion 238 mates with (e.g., bolted or fastened to) the second housing portion 240 to form the housing 204 such that the bushings 212 and 214 are concentric.

In examples, the first housing portion 238 (e.g., the cover plate) is machined (e.g., milled or drilled) to form a through-hole therein to house trunnion arm 206, the bushing 212, and the trunnion cap 216. Also, the second housing portion 240 is machined to form a through-hole therein to house trunnion arm 208, the bushing 214, and the trunnion cap 218.

The first housing portion 238 and the second housing portion 240 could be machined independently to form respective through-holes therein. However, machining the housing portions 238, 240 independently while maintaining concentricity of their respective through-holes may be difficult. Further, the input shaft 210 is perpendicular to the longitudinal axis 236 of the trunnion arms 206, 208. Thus, the second housing portion 240 is machined to form a hole through which the input shaft 210 is inserted, such that the input shaft 210 is perpendicular to the trunnion arms 206, 208. In other words, the axis of the hole through which the input shaft 210 is inserted is perpendicular to a longitudinal axis of the through-holes at which the trunnion arms 206, 208 are disposed. Machining these various holes to achieve this perpendicularity might also be difficult.

Disclosed herein are methods, processes, systems, assemblies, and a hydrostatic transmission that may alleviate the drawbacks of the above described configuration and installation process. Particularly, in contrast to a vertically-split housing (e.g., along the virtual line 237), a horizontally-split housing may be used. Further, instead of using two through-holes machined in different housing portions, the holes could be machined into a single housing portion and one of the holes may be configured as a cavity in a blind side of the housing instead of a through-hole.

Figure 3A:
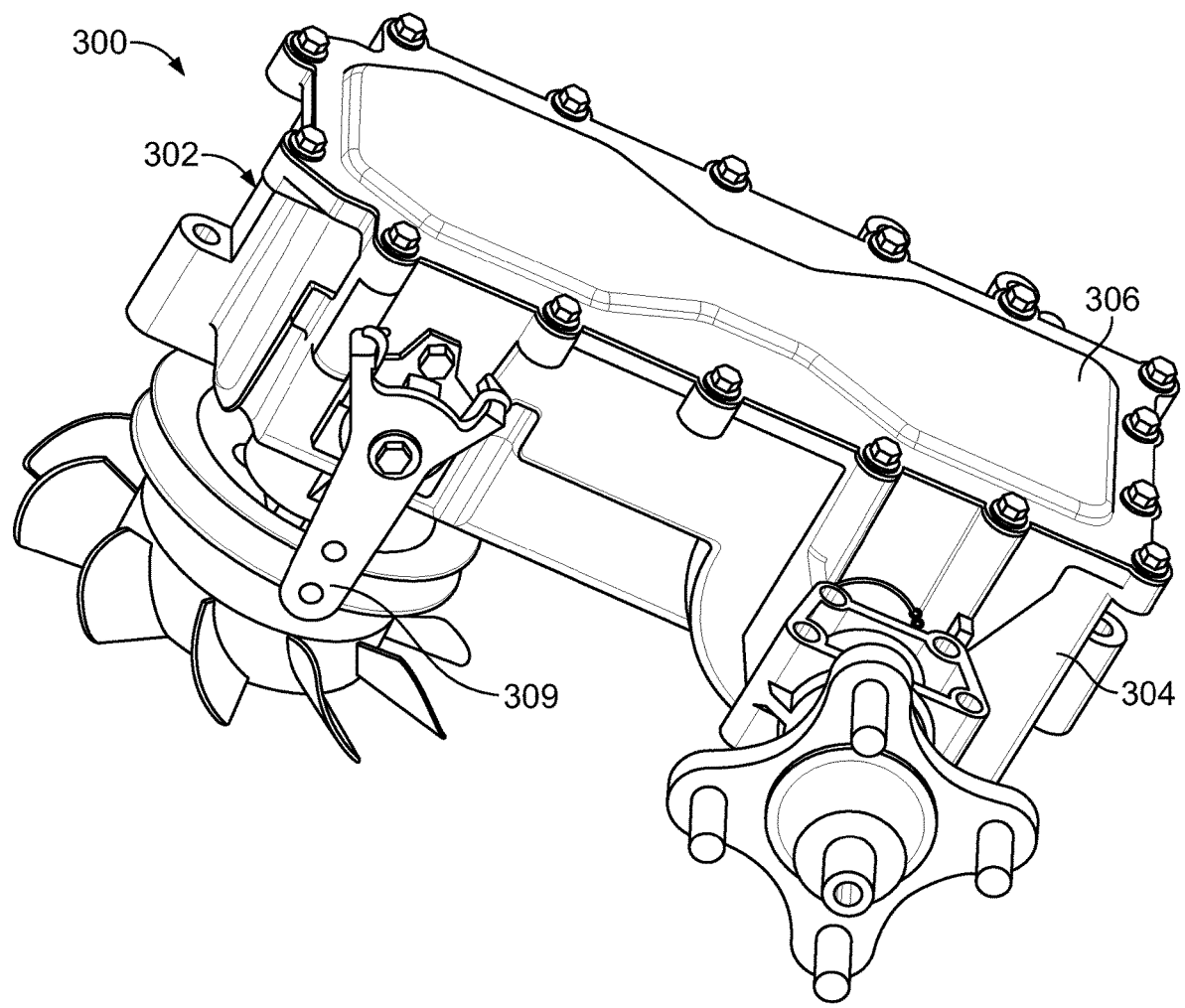
FIG. 3A illustrates a perspective view of a hydrostatic transmission having a housing that is horizontally-split, in accordance with an example implementation.

FIG. 3A illustrates a perspective view of a hydrostatic transmission 300 having a housing 302 that is horizontally-split, in accordance with an example implementation. As depicted in FIG. 3, the housing 302 is divided into a first housing portion 304 and a second housing portion 306 that are bolted together to form the housing 302.

Figure 3B:
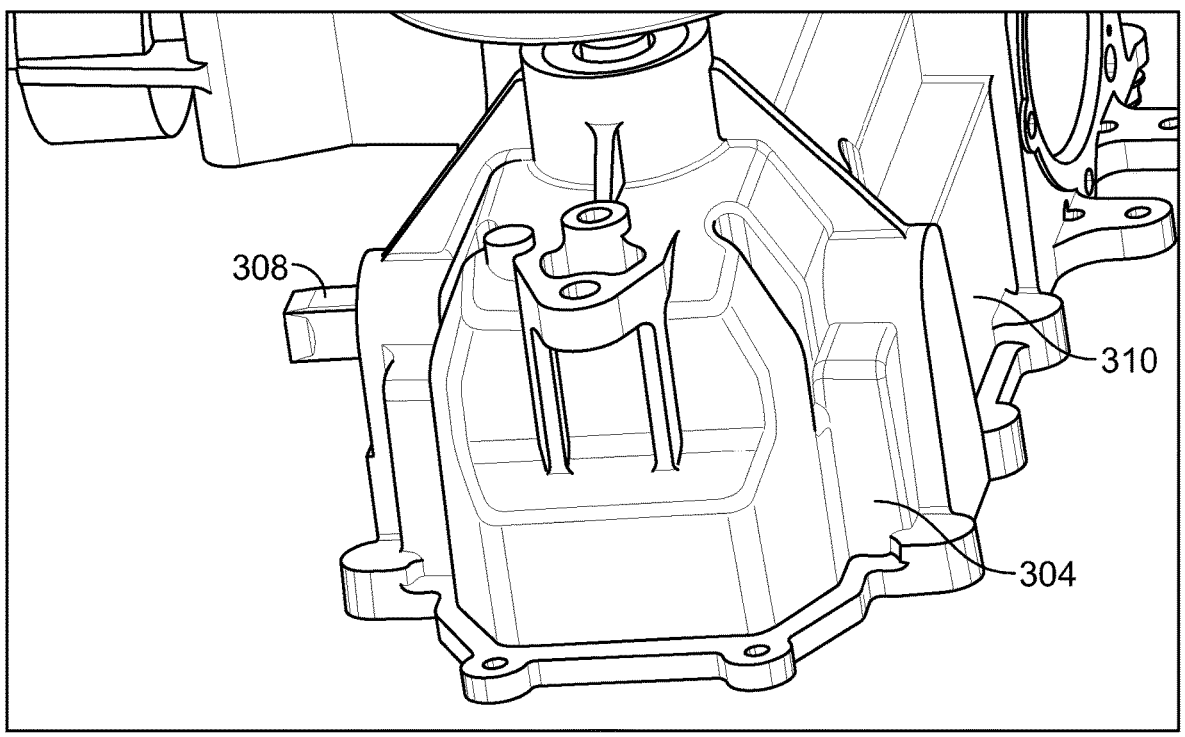
FIG. 3B illustrates a partial perspective view of a housing portion, in accordance with an example implementation.

FIG. 3B illustrates a partial perspective view of the first housing portion 304, in accordance with an example implementation. As shown in FIG. 3B, the first housing portion 304 may be machined to form a through-hole therein, through which a portion 308 of one trunnion arm protrudes to connect to an input lever 309 shown in FIG. 3A. However, in contrast to the housing 204 described above, the first housing portion 304 has a blind side 310, and a blind hole or cavity is formed in an interior surface of the first housing portion 304 without breaking through an exterior surface thereof. The blind hole or cavity is configured to support the other trunnion arm as described below. With this configuration, both holes (a through-hole and a blind hole) are formed in the same housing portion (e.g., the housing portion 304) to facilitate making them concentric.

FIGS. 4A-4F illustrate steps of a process of assembling a pump, in accordance with an example implementation. Particularly, FIG. 4A illustrates providing the first housing portion 304 and positioning a swash block 400 in an internal chamber 402 within the first housing portion 304, in accordance with an example implementation. The term "providing" as used herein with regard to a housing or a housing portion includes any action to make the housing or housing portion available for use, such as bringing the housing or housing portion to an apparatus or to a work environment for further processing of the housing or housing portion.

As shown in FIG. 4A, the first housing portion 304 may have a through-hole 404 machined (e.g., milled or drilled) therein on a first side of the first housing portion 304. Further, a blind hole 406 is formed on a second side of the first housing portion 304 opposite the first side thereof. The second side of the first housing portion 304 is the blind side 310 described above with respect to FIG. 3B. The blind hole 406 may be referred to as a cavity or a carved section formed on the interior surface of the first housing portion 304, but does not break through an exterior surface of the first housing portion 304 like the through-hole 404.

FIG. 4A illustrates an initial step 408 in the process of assembling the pump at which the first housing portion 304 is provided and the swash block 400 is positioned partially at an angle within the internal chamber 402 of the first housing portion 304. The swash block 400 has a first trunnion arm 410 and a second trunnion arm 412 concentric with the first trunnion arm 410. A bushing 414 may be mounted to the first trunnion arm 410 prior to positioning the swash block 400 within the internal chamber 402.

At the step 408, the second trunnion arm 412 is positioned partially and at an angle within the through-hole 404. As illustrated in FIG. 4A, the swash block 400 is dropped vertically within the internal chamber 402 as opposed to being inserted from a side of the housing as described above with respect to FIG. 2A.

FIG. 4B illustrates a step 416 at which the swash block 400 is positioned further within the internal chamber 402, in accordance with an example implementation. As shown in FIG. 4B, the trunnion arm 412 may be slipped or inserted further in the through-hole 404 such that the portion 308 protrudes outside the first housing portion 304. Inserting the trunnion arm 412 further within the through-hole 404 provides for more space between the trunnion arm 410 and an interior surface of the first housing portion 304, thus allowing the swash block 400 to be placed or "dropped" further within the internal chamber 402.

FIG. 4C illustrates a step 418 at which the swash block 400 is positioned further within the internal chamber 402 in preparation for placing the swash block 400 in a set-in position within the first housing portion 304, in accordance with an example implementation. The first housing portion 304 may have a first half-circular seat 420 adjacent the blind hole 406 and a second half-circular seat 422 adjacent the through-hole 404. The first and second half-circular seats 420, 422 are configured to accommodate portions of the first and second trunnion arms 410 and 412, respectively, which are cylindrical. As shown in FIG. 4C, the swash block 400 is now more leveled compared to its position in FIGS. 4A and 4B, and the trunnion arm 412 may be in contact with the half-circular seat 422.

FIG. 4D illustrates a step 424 at which the swash block 400 is placed in the set-in position within the first housing portion 304, in accordance with an example implementation. While the swash block 400 is in the set-in position shown in FIG. 4D, the bushing 414 and the trunnion arm 410 are seated and accommodated by the half-circular seat 420, which thus supports the trunnion arm 410. In the set-in position, the trunnion arm 410 and the bushing 414 are aligned with the blind hole 406. Further, while the swash block 400 is in the set-in position, the trunnion arm 412 is seated and accommodated by the half-circular seat 422, which supports the trunnion arm 412. In examples, the swash block 400 may be pushed toward the blind hole 406 (to the right in FIG. 4D) so as to insert and position the trunnion arm 410 and the bushing 414 partially within the blind hole 406.

FIG. 4E illustrates a step 426 at which a bushing 428 and a retaining seal 430 are inserted through the through-hole 404 about the trunnion arm 412, in accordance with an example implementation. While the swash block 400 is in the set-in position shown in FIG. 4D, the bushing 428 is inserted through the through-hole 404 about an exterior peripheral surface of the trunnion arm 412 to be mounted thereon. The trunnion arm 412 has a shoulder 432 that operates as a stop that the bushing 428 is secured against. An interior diameter of the bushing 428 and exterior diameter of the trunnion arm 412 may be configured such that the bushing 428 is press-fitted onto the trunnion arm 412.

Once the bushing 428 is in position against the shoulder 432, an interior peripheral surface of the bushing 428 interfaces with and contacts an exterior peripheral surface of the trunnion arm 412, and an exterior peripheral surface of the bushing 428 interfaces with and contacts a portion of an interior peripheral surface of the through-hole 404. The retaining seal 430 may then be inserted through the through-hole 404 to be mounted to the trunnion arm 412. The retaining seal 430 may facilitate holding the bushing 428 onto the trunnion arm 412. Once the retaining seal 430 is installed, its interior peripheral surface interfaces with and contacts the exterior peripheral surface of the trunnion arm 412, and an exterior peripheral surface of the retaining seal 430 interfaces with and contacts a portion of the interior peripheral surface of the through-hole 404.

An end face of the retaining seal 430 interfaces with a respective end face of the bushing 428 and acts as a shoulder that retains the bushing 428. The retaining seal 430 also seals the through-hole 404 to preclude leakage of fluid from the internal chamber 402 therethrough.

Further, as the bushing 428 and the retaining seal 430 are installed onto the trunnion arm 412, thus pushing the swash block 400 further within the cavity of the blind hole 406, the bushing 414 and the trunnion arm 410 are press-fitted and inserted further within the cavity of the blind hole 406.

FIG. 4F illustrates the swash block 400 assembled to the first housing portion 304, in accordance with an example implementation. Once the bushing 414 and the trunnion arm 410 are inserted further within the cavity of the blind hole 406, assembly of the swash block 400 within the first housing portion 304 may be completed. A next step in the assembly process may involve coupling the second housing portion 306 shown in FIG. 3A to the first housing portion 304 via a plurality of fasteners or bolts, such as bolt 434 shown in FIG. 4F. The input lever 309 may then be coupled to the portion 308 of the trunnion arm 412.

As mentioned above, the first and second half-circular seats 420, 422 are configured to accommodate portions of the first and second trunnion arms 410 and 412, respectively. Although portions of the trunnion arm 410 and the bushing 414 are supported by the half-circular seat 420, end sections of the trunnion arm 410 and the bushing 414, which are disposed within the blind hole 406, are supported along their entire circumferences by the interior peripheral surface of the blind hole 406. Similarly, although portions of the trunnion arm 412 and the bushing 428 are supported by the half-circular seat 422, sections of the trunnion arm 412 and the bushing 428 are supported along their entire circumferences by the interior peripheral surface of the through-hole 404. With this configuration the bushings 414, 428 and the trunnion arms 410, 412 are fully supported and retained along 360° of their circumferences, thus enhancing their load carrying capacities.

Figure 5:
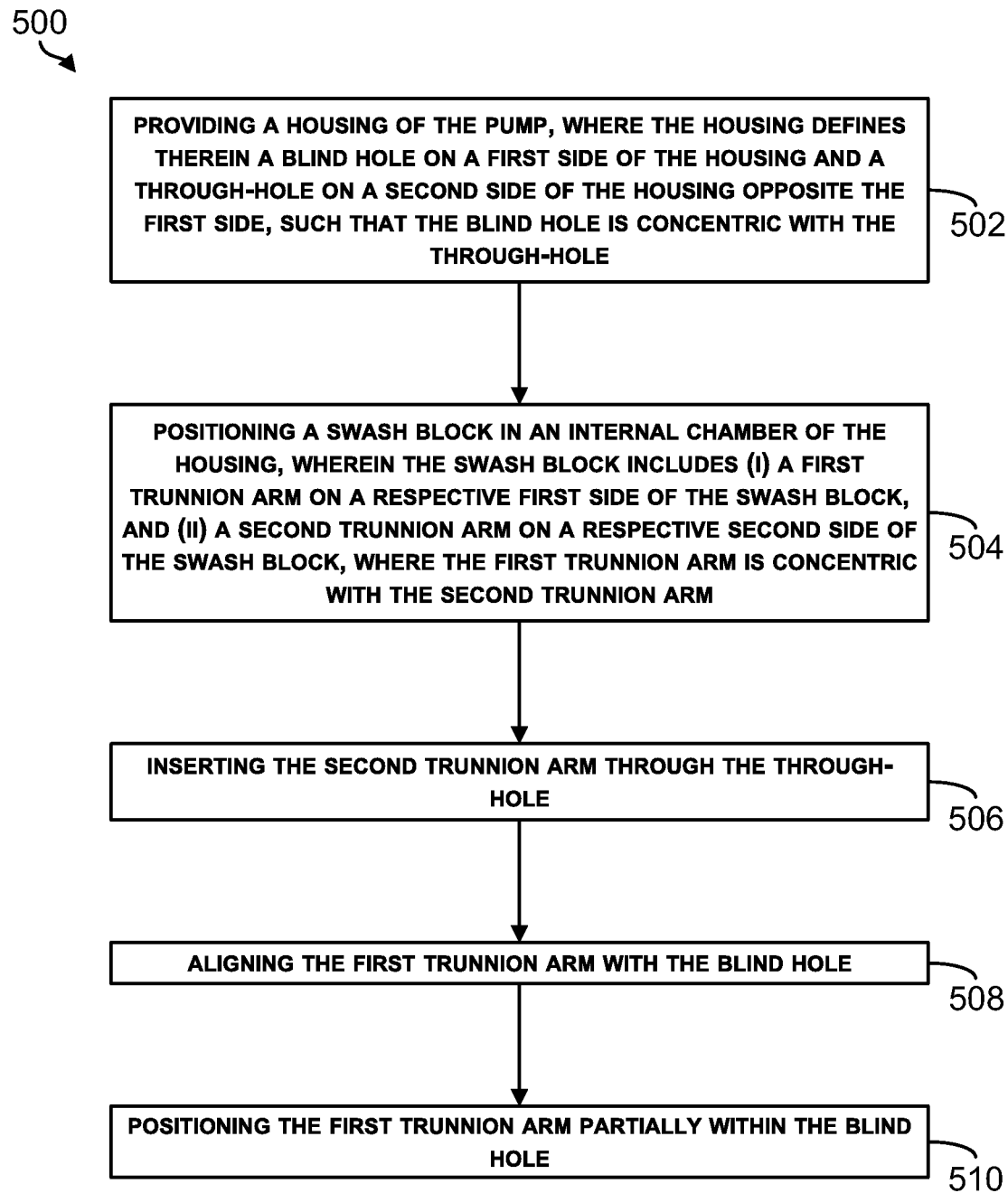
FIG. 5 is a flowchart of a method for assembling a pump, in accordance with an example implementation.

FIG. 5 is a flowchart of a method 500 for assembling a pump, in accordance with an example implementation. The method 500 may include one or more operations or actions as illustrated by one or more of blocks 502-510. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. Further, other operations and actions could be added to the method 500.

At block 502, the method 500 includes providing a housing of the pump, where the housing defines therein a blind hole on a first side of the housing and a through-hole on a second side of the housing opposite the first side, such that the blind hole is concentric with the through-hole. As mentioned above, the term "providing" as used herein with regard to a housing or a housing portion includes any action to make the housing or housing portion available for use, such as bringing the housing or housing portion to an apparatus or to a work environment for further processing of the housing or housing portion.

In line with the discussion related to FIGS. 3A-3B and 4A-4F, the housing 302, and particularly, the first housing portion 304 may define therein the through-hole 404 on a first side of the housing 302 and the blind hole 406 on a second (blind) side of the housing 302 opposite the first side. The blind hole 406 is concentric with the through-hole 404.

At block 504 the method 500 includes positioning a swash block in an internal chamber of the housing, where the swash block includes (i) a first trunnion arm on a respective first side of the swash block, and (ii) a second trunnion arm on a respective second side of the swash block, where the first trunnion arm is concentric with the second trunnion arm. As described above with respect to FIG. 4A, the swash block 400 may be inserted, positioned, or "dropped" within the internal chamber 402 of the housing 302. The swash block 400 has the trunnion arms 410, 412 disposed on opposite sides of the swash block 400. The trunnion arms 410, 412 are cylindrical and thus have circular cross sections, such that circular cross sections of the trunnion arm 410 are concentric with circular cross sections of the trunnion arm 412. A bushing 414 may be mounted to the first trunnion arm 410 prior to positioning the swash block 400 within the internal chamber 402.

At block 506, the method 500 includes inserting the second trunnion arm through the through-hole. As described above with respect to FIGS. 4A-4B, the trunnion arm 412 is inserted through the through-hole 404 such that the portion 308 of the trunnion arm 412 protrudes outside the first housing portion 304. Inserting the trunnion arm 412 within the through-hole 404 provides for space between the trunnion arm 410 and an interior surface of the first housing portion 304, thus allowing the swash block 400 to be placed or "dropped" further within the internal chamber 402.

At block 508, the method 500 includes aligning the first trunnion arm with the blind hole. As described with respect to FIGS. 4C and 4D, the swash block 400 is positioned further within the internal chamber 402 in preparation for placing the swash block 400 in a set-in position within the first housing portion 304. The first housing portion 304 may have a first half-circular seat 420 adjacent the blind hole 406 and a second half-circular seat 422 adjacent the through-hole 404. The first and second half-circular seats 420, 422 are configured to accommodate portions of the first and second trunnion arms 410 and 412, respectively, which are cylindrical.

When the swash block 400 is placed in the set-in position, the bushing 414 and the trunnion arm 410 are seated and accommodated by the half-circular seat 420. In this position, the trunnion arm 410 and the bushing 414 are aligned with the blind hole 406. Further, when the swash block 400 is in the set-in position shown in FIG. 4D, the trunnion arm 412 is seated and accommodated by the half-circular seat 422, which supports the trunnion arm 412.

At block 510, the method 500 includes positioning the first trunnion arm partially within the blind hole. As described above with respect to FIG. 4D, in examples, the swash block 400 may be pushed toward the blind hole 406 (to the right in FIG. 4D) so as to insert and position the trunnion arm 410 and the bushing 414 partially within the blind hole 406. In other examples, while the swash block 400 is in the set-in position shown in FIG. 4D, the bushing 428 is inserted through the through-hole 404 about an exterior peripheral surface of the trunnion arm 412 to be mounted thereon. Inserting the bushing 428 about the trunnion arm 412 pushes the swash block 400 further within the cavity of the blind hole 406, causing the bushing 414 and the trunnion arm 410 to be press-fitted and inserted further within the cavity of the blind hole 406.

In examples, the retaining seal 430 may be inserted through the through-hole 404 to be mounted to the trunnion arm 412. Once the retaining seal 430 is installed, its interior peripheral surface interfaces with and contacts the exterior peripheral surface of the trunnion arm 412 and an exterior peripheral surface of the retaining seal 430 interfaces with and contacts a portion of the interior peripheral surface of the through-hole 404.

As mentioned above, a portion of the trunnion arm 412 (e.g., the portion 308) may be protruding laterally outside the housing 302, and the input lever 309 may be coupled the portion 308 of the trunnion arm 412. Rotation of the input lever 309 causes the trunnion arm 412 and the swash block 400 to rotate about a longitudinal axis of the trunnion arm 412 to change the amount of flow provided by the pump.

Further, as mentioned above, the second housing portion 306 may be coupled to the first housing portion 304 to form the housing 302 and enclose the internal chamber 402.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A pump comprising:
    a swash block having (i) a first trunnion arm on a first side of the swash block, and (ii) a second trunnion arm on a second side of the swash block, wherein the swash block, the first trunnion arm, and the second trunnion arm are configured as a single block; and
    a housing comprising a first housing portion and a second housing portion configured to interface and mate with the first housing portion to form the housing and enclose an internal chamber, wherein the first housing portion is configured as a single block comprising (i) a through-hole disposed on a respective first side of the first housing portion, and (ii) a blind hole disposed on a respective second side of the first housing portion opposite the respective first side thereof,
    wherein the swash block is supported within the internal chamber of the housing by the first trunnion arm being positioned in the through-hole of the housing and the second trunnion arm being positioned in the blind hole of the housing, wherein a portion of the first trunnion arm protrudes laterally outside the first housing portion via the through-hole.

2. The pump of claim 1, further comprising:
    a first bushing disposed partially in the through-hole about the first trunnion arm; and
    a second bushing disposed partially in the blind hole about the second trunnion arm.

3. The pump of claim 2, further comprising:
    a retaining seal disposed in the through-hole adjacent the first bushing.

4. The pump of claim 1, further comprising:
    a swash plate disposed in the swash block;
    a pump barrel defining a plurality of longitudinal bores therein;
    a plurality of pistons, wherein each piston of the plurality of pistons is disposed in a respective longitudinal bore of the plurality of longitudinal bores and configured to engage the swash plate; and
    an input shaft coupled to the pump barrel, such that rotation of the input shaft causes the pump barrel and the plurality of pistons disposed therein to rotate about a longitudinal axis of the input shaft.

5. The pump of claim 4, wherein the pump further comprises:
    an input lever coupled to the portion of the first trunnion arm protruding outside the housing, wherein rotation of the input lever causes: (i) the first trunnion arm to rotate, and (ii) the swash block and the swash plate disposed therein to rotate about an axis perpendicular to the longitudinal axis of the input shaft, thereby changing a stroke of the plurality of pistons as the plurality of pistons rotate about the longitudinal axis of the input shaft.

6. The pump of claim 1, wherein the blind hole is formed as a cavity in an interior surface of the housing.

7. A method for assembling a pump, the method comprising:
    providing a housing of the pump, wherein the housing comprises a first housing portion and a second housing portion configured to interface and mate with the first housing portion to form the housing and enclose an internal chamber therein, wherein the first housing portion is configured as a single block comprising a blind hole on a first side of the first housing portion and a through-hole on a second side of the first housing portion opposite the first side, such that the blind hole is concentric with the through-hole;
positioning a swash block in the internal chamber of the housing, wherein the swash block includes (i) a first trunnion arm on a respective first side of the swash block, and (ii) a second trunnion arm on a respective second side of the swash block configured as a single block, wherein the first trunnion arm is concentric with the second trunnion arm;
inserting the second trunnion arm through the through-hole;
aligning the first trunnion arm with the blind hole; and
positioning the first trunnion arm partially within the blind hole.

8. The method of claim 7, further comprising:
positioning a first bushing about the first trunnion arm, wherein aligning the first trunnion arm with the blind hole comprises aligning the first bushing with the blind hole;
inserting a second bushing through the through-hole about the second trunnion arm; and
mounting the second bushing to the second trunnion arm, such that an interior peripheral surface of the second bushing interfaces with an exterior peripheral surface of the second trunnion arm.

9. The method of claim 8, wherein mounting the second bushing to the second trunnion arm comprises pressing the second bushing in position about the second trunnion arm to secure the second bushing thereon, wherein pressing the second bushing causes the first bushing to be inserted partially in the blind hole.

10. The method of claim 7, further comprising:
inserting a retaining seal through the through-hole; and
positioning the retaining seal in the through-hole such that an exterior peripheral surface of the retaining seal interfaces with an interior peripheral surface of the through-hole, and an interior peripheral surface of the retaining seal interfaces with the second trunnion arm.

11. The method of claim 7, wherein the second trunnion arm disposed in the through-hole protrudes laterally outside the housing, the method further comprising:
coupling an input lever to a portion of the second trunnion arm protruding outside the housing, wherein rotation of the input lever causes the second trunnion arm and the swash block to rotate about a longitudinal axis of the second trunnion arm.

12. The method of claim 7, further comprising:
coupling the second housing portion of the housing to the first housing portion to form the housing and enclose the internal chamber.

13. A pump assembled by a process comprising:
providing a housing of the pump, wherein the housing comprises a first housing portion and a second housing portion configured to interface and mate with the first housing portion to form the housing and enclose an internal chamber therein, wherein the first housing portion is configured as a single block comprising a blind hole on a first side of the first housing portion and a through-hole on a second side of the first housing portion opposite the first side, such that the blind hole is concentric with the through-hole;
positioning a swash block in the internal chamber of the housing, wherein the swash block includes (i) a first trunnion arm on a respective first side of the swash block, and (ii) a second trunnion arm on a respective second side of the swash block configured as a single block, wherein the first trunnion arm is concentric with the second trunnion arm;
inserting the second trunnion arm through the through-hole;
aligning the first trunnion arm with the blind hole; and
positioning the first trunnion arm partially within the blind hole.

14. The pump of claim 13, wherein the pump further comprises:
a first bushing positioned about the first trunnion arm, wherein the first bushing is aligned with the blind hole; and
a second bushing positioned in the through-hole about the second trunnion arm such that an interior peripheral surface of the second bushing interfaces with an exterior peripheral surface of the second trunnion arm.

15. The pump of claim 14, further comprising:
a retaining seal disposed in the through-hole such that an exterior peripheral surface of the retaining seal interfaces with an interior peripheral surface of the through-hole, and an interior peripheral surface of the retaining seal interfaces with the second trunnion arm, and wherein an end face of the retaining seal interfaces with a respective end face of the second bushing and forms a shoulder that retains the second bushing in the through-hole.

16. The pump of claim 13, wherein the second trunnion arm disposed in the through-hole protrudes laterally outside the housing, wherein the pump further comprises an input lever coupled to a the portion of the second trunnion arm protruding outside the housing, wherein rotation of the input lever causes the second trunnion arm and the swash block to rotate about a longitudinal axis of the second trunnion arm.

17. A hydrostatic transmission comprising:
a motor rotatable by fluid; and
a pump fluidly coupled to the motor and configured to provide the fluid to the motor, wherein the pump comprises:
a swash block having (i) a first trunnion arm on a first side of the swash block, and (ii) a second trunnion arm on a second side of the swash block configured as a single block, and
a housing comprising a first housing portion and a second housing portion configured to interface and mate with the first housing portion to form the housing and enclose an internal chamber, wherein the first housing portion is configured as a single block comprising (i) a through-hole disposed on a respective first side of the housing, and (ii) a blind hole disposed on a respective second side of the housing opposite the respective first side thereof, wherein the swash block is supported within the internal chamber of the housing by the first trunnion arm being inserted through the through-hole of the housing and the second trunnion arm being positioned in the blind hole of the housing.

18. The hydrostatic transmission of claim 17, wherein the pump further comprises:
a first bushing disposed partially in the through-hole about the first trunnion arm; and
a second bushing disposed partially in the blind hole about the second trunnion arm.

19. The hydrostatic transmission of claim 18, wherein the pump further comprises:

a retaining seal disposed in the through-hole adjacent the first bushing.

20. The hydrostatic transmission of claim 17, wherein the pump further comprises:
- a swash plate disposed in the swash block;
- a pump barrel defining a plurality of longitudinal bores therein;
- a plurality of pistons, wherein each piston of the plurality of pistons is disposed in a respective longitudinal bore of the plurality of longitudinal bores and configured to engage the swash plate; and
- an input shaft coupled to the pump barrel, such that rotation of the input shaft causes the pump barrel and the plurality of pistons disposed therein to rotate about a longitudinal axis of the input shaft.

21. The hydrostatic transmission of claim 20, wherein the first trunnion arm disposed in the through-hole protrudes laterally outside the housing, and wherein the pump further comprises:
- an input lever coupled to a portion of the first trunnion arm protruding outside the housing, wherein rotation of the input lever causes: (i) the first trunnion arm to rotate, and (ii) the swash block and the swash plate disposed therein to rotate about an axis perpendicular to the longitudinal axis of the input shaft, thereby changing a stroke of the plurality of pistons as the plurality of pistons rotate about the longitudinal axis of the input shaft.

22. The hydrostatic transmission of claim 17, wherein the blind hole is formed as a cavity in an interior surface of the housing.

\* \* \* \* \*